United States Patent [19]
Colding et al.

[11] 3,815,996
[45] June 11, 1974

[54] DEVICE FOR MEASURING THE DISPLACEMENT OF A MEASURING POINT ALONG AT LEAST TWO COORDINATE DIRECTIONS

[75] Inventors: Bertil Colding, Vasteras; Nils Abramson; Unto Sandstrom, both of Stockholm, all of Sweden

[73] Assignee: Lasergruppen Konsult AB, Stockholm, Sweden

[22] Filed: Oct. 3, 1972

[21] Appl. No.: 294,571

[30] Foreign Application Priority Data
Oct. 13, 1971 Sweden............................ 12966/71

[52] U.S. Cl................................. 356/106, 356/110
[51] Int. Cl. ........................................... G01b 9/02

[58] Field of Search............................ 356/106, 110

[56] References Cited
UNITED STATES PATENTS
3,622,244  11/1971  Chetayat............................ 356/106
3,715,599  2/1973  Marcy................................ 356/106

*Primary Examiner*—John K. Corbin
*Assistant Examiner*—Conrad Clark
*Attorney, Agent, or Firm*—Pierce, Scheffler & Parker

[57] ABSTRACT

An optical device which measures the displacement of a measuring point along at least two coordinate directions which are perpendicular to each other utilizing a laser beam as a source of light in conjunction with a pair of interferometers.

3 Claims, 1 Drawing Figure

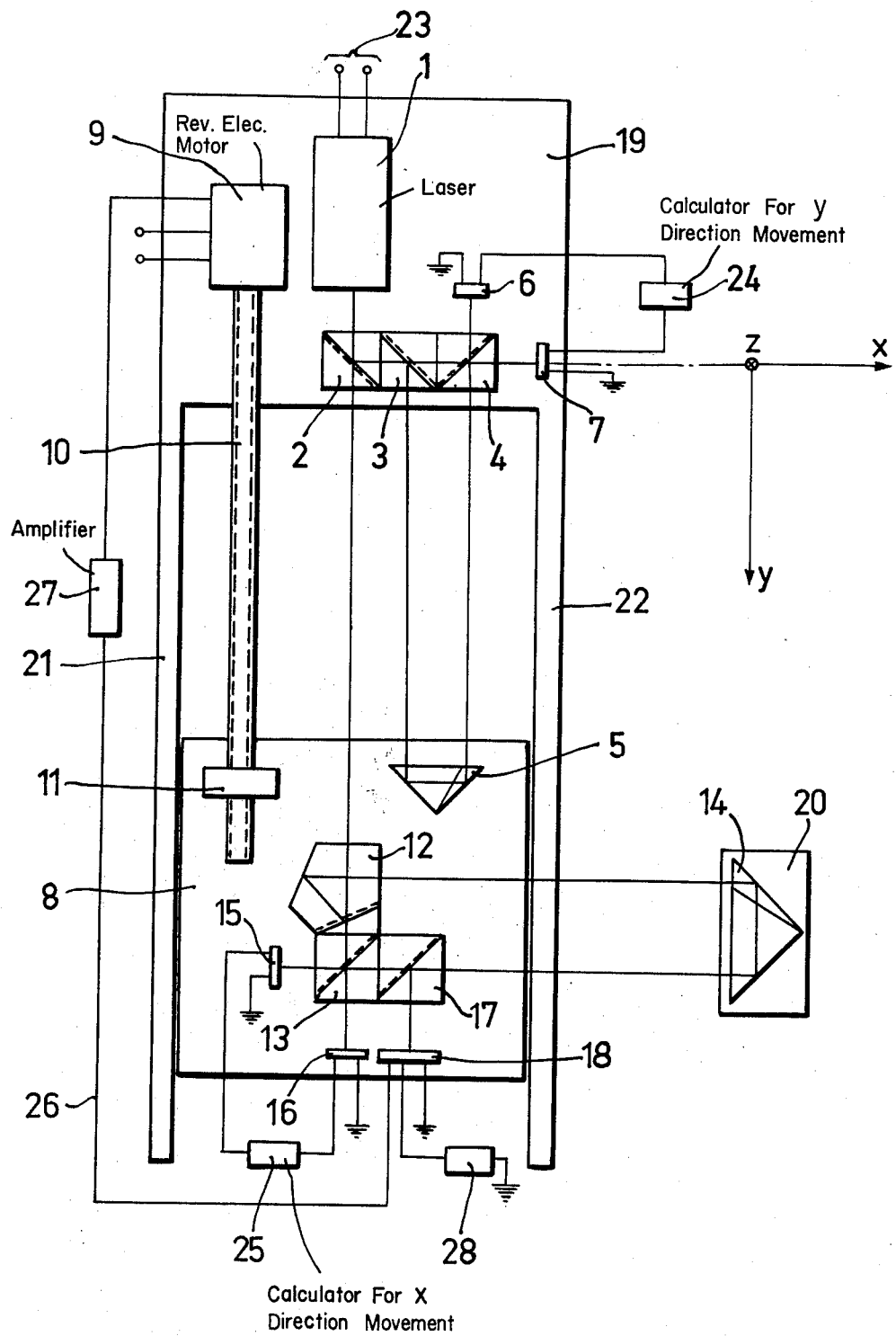

DEVICE FOR MEASURING THE DISPLACEMENT OF A MEASURING POINT ALONG AT LEAST TWO COORDINATE DIRECTIONS

The present invention relates to a device for measuring the displacement of a measuring point along at least two coordinate directions, preferably perpendicular to each other, utilizing a laser beam emitted from a laser and interferometers.

Previously known devices of this kind utilize interferometers measuring displacements along accurate guides. Very high requirements must be laid on the guides since otherwise the beam reflected from the interferometers does not meet the reference beam. The known devices are consequently complicated and require expensive equipment to be reliable.

The present invention gives the solution to a device of the above mentioned kind, which considerably simplifies the equipment at the same time as the accurance is maintained and certain new functions are entered. The characteristics of the invention appear from the following claims and comprise a beam dividing prism arranged in the laser beam emitted from the laser, a first interferometer arranged in the path of one beam from said beam dividing prism; a second interferometer arranged in the path of a second beam from said beam dividing prism and being arranged movable along one (y) of said coordinate directions; said first interferometer including a beam reflecting means positively movably arranged together with said second interferometer and, by means of detectors for a measuring beam from said beam reflecting means and for a reference beam, being arranged to measure a displacement of said beam reflecting means and accordingly said second interferometer along said one coordinate direction; said second interferometer including a beam reflecting means placed in said measuring point and, by means of detectors for a measuring beam from said beam reflecting means placed in the measuring point and for a reference beam, being arranged to measure a displacement of the measuring point in said second (for instance X) or other coordinate directions; center detecting means arranged in said measuring beam from said beam reflecting means placed in the measuring point for detecting the position of said measuring beam; and drive means arranged to be governed by deviations from a zero signal indicated by said center detecting means for moving said second interferometer in said one coordinate direction until zero signal is again obtained from said center detecting means. By utilizing a center detector also an indication of deviations or displacements in a third coordinate direction has been made possible.

An embodiment of the invention will be described below with reference to the enclosed drawing.

A support 19 is provided with two guides 21, 22. A slide 8 is accurately guided between the guides 21, 22. A laser 1 having electric connections 23 is placed on the support such that it transmits a beam to the slide. A beam dividing prism 2 supported by the support 19 is arranged in the path of the beam. The deflected beam from this prism hits a first interferometer comprising two prisms 3 and 4 adjacent the prism 2 and a reflecting prism 5. The deflected beam from the prism 3 hits the reflecting prism 5 and is reflected back to the prism 4. The prism 5 is preferably a so-called cube corner prism, i.e. a prism having three reflecting surfaces forming 90° to each other. Such a prism gives parallelism between the incoming and the reflecting beam at the same time as these beams run with equal distance in relation to a symmetry axis in the prism. The measuring beam, which is reflected from the prism 5, is divided in the prism 4, so that thus divided beams hit two detectors 6 and 7 respectively, and the reference beam, i.e. the beam deflected by the prism 2, passes through the prism 3, is divided in the prism 4 and hits the detectors 6 and 7. In the dividing point in the prism 4 interferences between the measuring beam and the reference beam occur, which interferences are dependent of the distance differences for these beams. The interferences are in known manner detected by the detectors 6 and 7 and may be registered registered by a calculating unit 24. This registration corresponds to the displacement of the slide 8, on which the prism 5 of the interferometer is placed. The displacement direction of the slide is on the drawing indicated as y-direction.

The part of the laser beam that passes undeflected through the prism 2 hits a second interferometer comprising two beam dividing prisms 12 and 13 situated on the slide 8 and a cube corner prism 14 situated in a measuring point 20, the movement of which shall be measured. The entrance prism 12 for this second interferometer is preferably a beam dividing pentagon prism. This type of prism guarantees that the measuring beam will be accurately perpendicular to the incoming beam, which also guarantees that the measured coordinate directions will be perpendicular. The beam deflected in the pentagon prism 12 hits the cube corner prism 14 and is reflected to the beam dividing prism 13 of the interferometer, where it is combined with the reference beam which has passed undeflected through the prism 12. The arising interference fringes are detected by detectors 15 and 16 and can be indicated by a proper indicating means 25, such as a calculating unit. By means of this second interferometer the displacement of the measuring point in x-direction can be measured.

A further beam dividing prism 17 is inserted in the beam path between the cube corner prism 14 and the beam dividing prism 13. A beam deflected by the prism 17 hits a center detector 18. This detector is arranged such that it emits a zero signal, when the deflected beam hits its center, i.e. when the measuring beam hits the center of the prism 17 and thus also the center of the prism 13. Upon displacements of the measuring point in y-direction the reflected measuring beam from the cube corner prism 14 will also be displaced relative to the center of the center detector, so that an output signal is obtained. This output signal is transmitted in an electric circuit 26 via an amplifier 27 to an electric motor 9 supported by the support 19. The motor is controlled by the control signal in the circuit 26 and drives a driving means for the slide, such as a screw 10 cooperating with a nut 11 on the slide 8. On this displacement the slide is moved in such a direction that the output signal from the center detector decreases towards zero, i.e. the slide will follow the displacement of the measuring point 20.

Summing up, the described device can accordingly measure displacements in x-direction, which are indicated by the indicating means 25, and displacements in y-direction, which are indicated by the indicating means 24. In addition, an automatic displacement of the slide occurs in y-direction, so that the movement of the measuring point is compensated, i.e. such that the slide is displaced to the level of the measuring point.

It is obvious, that the center detector can indicate displacements of the measuring point also in a direction perpendicular to x- and y-directions, i.e. in z-direction, which can be indicated by an indicating means 28.

The device according to the invention is accordingly adapted to measure displacements, which are independant of straight guidances, in two or three coordinate directions. Application fields include measurements along a floor, for instance in a workshop, measurements in terrain and coordinate determinations, for instance the exact position of a pen on a drawing-table automatically controlled and coupled to a computor. The device can also be used for straight measuring in for instance tool machines and roll mills.

What we claim is:

1. A device for measuring the displacement of a measuring point along at least two preferably perpendicular coordinate directions comprising a stationary laser beam producing source, a stationary beam dividing prism located in the path of the laser beam emitted from said source for dividing said beam into first and second beams for use respectively in measuring displacement of the point along the two coordinate directions, a first interferometer located in the path of said first laser beam, a second interferometer located in the path of said second laser beam and which is arranged for movement along a first one of said coordinate directions, said first interferometer including a first reflecting means for said first laser beam arranged for movement along said first coordinate direction together with said second interferometer and detector means respectively for detecting the beam reflected by said first reflecting means and a reference beam divided out of said first laser beam thereby effecting a measurement of the displacement of said first beam reflecting means and accordingly also of said second interferometer and point along said first coordinate direction, said second interferometer including a second reflecting means for said second laser beam located at said measuring point and detector means respectively for detecting the beam reflected by said second reflecting means and a reference beam divided out of said second laser beam thereby effecting a measurement of the displacement of said point along said second coordinate direction, center detecting means located in the path of the beam reflected by said second reflecting means for detecting the position of said beam, and reversible drive means controlled in accordance with the deviation from zero of the signal produced by said center detecting means for moving said second interferometer along said first coordinate direction in such sense as to return the signal produced by said center detecting means to zero.

2. A device according to claim 1, characterized in that said center detecting means includes a beam dividing prism and a center detector, said prism being arranged in said measuring beam reflected from said beam reflecting means and reflects a beam to said center detector.

3. A device according to claim 1, characterized in that a pentagon prism is used as entrance prism in said second interferometer.

* * * * *